(12) United States Patent
Koujina

(10) Patent No.: US 7,979,505 B2
(45) Date of Patent: Jul. 12, 2011

(54) CONTENTS REPRODUCTION SYSTEM

(75) Inventor: Atsushi Koujina, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 86 days.

(21) Appl. No.: 12/247,714

(22) Filed: Oct. 8, 2008

(65) Prior Publication Data

US 2009/0094323 A1    Apr. 9, 2009

(30) Foreign Application Priority Data

Oct. 9, 2007 (JP) .................................. 2007-263488

(51) Int. Cl.
*G06F 15/16* (2006.01)
(52) U.S. Cl. ....................................................... 709/217
(58) Field of Classification Search .................... 709/217
See application file for complete search history.

(56) References Cited

U.S. PATENT DOCUMENTS

| | | | |
|---|---|---|---|
| 6,074,434 A | 6/2000 | Cole et al. | |
| 6,195,678 B1 | 2/2001 | Komuro | |
| 6,378,129 B1 * | 4/2002 | Zetts | 709/248 |
| 7,130,892 B2 * | 10/2006 | Mukai | 709/217 |
| 7,392,481 B2 * | 6/2008 | Gewickey et al. | 709/217 |
| 2004/0139173 A1 | 7/2004 | Karaoguz et al. | |
| 2006/0161635 A1 | 7/2006 | Lamkin et al. | |
| 2006/0184617 A1 * | 8/2006 | Nicholas et al. | 709/203 |
| 2006/0248209 A1 * | 11/2006 | Chiu et al. | 709/231 |
| 2007/0025704 A1 | 2/2007 | Tsukazaki et al. | |
| 2007/0089174 A1 | 4/2007 | Bader et al. | |
| 2007/0299978 A1 * | 12/2007 | Neumann et al. | 709/229 |
| 2008/0152096 A1 * | 6/2008 | Archer | 379/88.14 |
| 2008/0318525 A1 * | 12/2008 | Tanabe | 455/41.2 |

FOREIGN PATENT DOCUMENTS

| | | |
|---|---|---|
| JP | 2005-44104 A | 2/2005 |
| JP | 2006-221646 A | 8/2006 |
| JP | 2007-4773 A | 1/2007 |

OTHER PUBLICATIONS

Wills, C. E., Mikhailov, M., and Shang, H. 2001. N for the price of 1: bundling web objects for more efficient content delivery. In Proceedings of the 10th international Conference on World Wide Web (Hong Kong, Hong Kong, May 1-5, 2001). WWW '01. ACM, New York, NY.*
European Search Report dated Mar. 2, 2009 (eleven (11) pages).

\* cited by examiner

*Primary Examiner* — Ajay Bhatia
(74) *Attorney, Agent, or Firm* — Crowell & Moring LLP

(57) ABSTRACT

A contents reproduction system comprises: a server apparatus for storing contents obtained from external and a client apparatus by which the contents stored in the server apparatus is reproducible, wherein the server apparatus includes: a list preparing section for preparing a list of the contents stored in a contents storage section; and a list transmitting section for transmitting the contents list prepared by the list preparing section to the client apparatus, and the client apparatus includes: a list comparing section for comparing a first list stored in a list storage section and a second list newly obtained by a list obtaining section; an additional contents presentation section for presenting newly added content by a recognizable form based on a comparison result obtained by the list comparing section; a contents reproduction section for reproducing the content presented by the additional contents presentation section based on a control signal indicating reproduction.

7 Claims, 10 Drawing Sheets

CONTENTS REPRODUCTION SYSTEM

BACKGROUND OF THE INVENTION

1. Field of the Invention

The invention relates to a server for storing contents such as video or music, and so on, and a client for reproducing the contents stored in the server, which are connected communicatably.

2. Description of Related Art

In recent years, various kinds of AV equipments are connected to a network such as a home LAN (Local Area Network), and so on, and a system capable of e.g. retrieving, moving, copying, and reproducing AV contents stored in the various kinds of the AV equipments mutually is provided.

In this network system, an equipment for storing contents and providing the stored contents is a server, and an equipment for reproducing the contents provided from the server is a client.

Also, when a plurality of servers for storing contents exist on a network, a function capable of performing package display about contents of the candidate for search is useful in order to easily retrieve the contents in the client side. Therefore, it is disclosed that a list of contents managed by the various kinds of AV equipments connected to the network is displayed after package collection (For example, see Japanese Patent Laid-Open No. 2005-44104, Japanese Patent Laid-Open No. 2007-4773, and Japanese Patent Laid-Open No. 2006-221646).

SUMMARY OF THE INVENTION

However, in the prior art, since the newest contents list is always displayed when new content is added to a server and a contents list is updated, it is difficult to know the old contents and newly added content.

It is, therefore, a main object of the invention to provide a contents reproduction system capable of easily knowing which content is added in a server on a network, and easily reproducing the content.

According to a first aspect of the invention which is provided to solve the above mentioned problem, a contents reproduction system comprises:

a server apparatus for storing contents obtained from external and a client apparatus by which the contents stored in the server apparatus is reproducible, which are connected communicatably, wherein the server apparatus includes:

a contents obtaining section for obtaining content from external;

a contents storage section for storing the content obtained by the contents obtaining section;

a list preparing section for preparing a list of the contents stored in the contents storage section; and a list transmitting section for transmitting the contents list prepared by the list preparing section to the client apparatus, and the client apparatus includes:

a list obtaining section for obtaining the contents list from the server apparatus;

a list storage section for storing the contents list obtained by the list obtaining section;

a list comparing section for comparing a first contents list stored in the list storage section and a second contents list newly obtained by the list obtaining section;

an additional contents presentation section for presenting newly added content by a recognizable form based on a comparison result obtained by the list comparing section;

a contents reproduction section for reproducing the content presented by the additional contents presentation section based on a control signal indicating reproduction.

According to other aspect of the invention, a contents reproduction system comprises:

a server apparatus for storing contents obtained from external and a client apparatus by which the contents stored in the server apparatus is reproducible, which are to be connected communicatably, wherein the server apparatus includes:

a contents obtaining section for obtaining content from external;

a contents storage section for storing the content obtained by the contents obtaining section;

a client discrimination section for discriminating the client apparatus based on client identification information transmitted from the client apparatus; and a client release permission setting section for permitting release for each client apparatus with respect to the newly obtained content, a list preparing section for preparing a list of the contents stored in the contents storage section for each client apparatus, based on setting information by the client release permission setting section when the contents obtaining section newly obtains content; and a list transmitting section for transmitting the contents list prepared by the list preparing section to the client apparatus immediately or based on a request from the client apparatus, and the client apparatus includes:

a list obtaining section for obtaining the contents list from the server apparatus;

a list storage section for storing the contents list obtained by the list obtaining section;

a list comparing section for comparing a first contents list stored in the list storage section and a second contents list newly obtained by the list obtaining section;

an additional contents presentation section for presenting newly added content by a recognizable form based on a comparison result obtained by the list comparing section;

a contents reproduction section for reproducing the content presented by the additional contents presentation section based on a control signal indicating reproduction.

According to other aspect of the invention, a client apparatus connected communicatably to a server apparatus for storing contents obtained from external, and the client apparatus by which the contents stored in the server apparatus is reproducible, the apparatus comprises:

a list obtaining section for obtaining the contents list from the server apparatus;

a list storage section for storing the contents list obtained by the list obtaining section;

a list comparing section for comparing a first contents list stored in the list storage section and a second contents list newly obtained by the list obtaining section;

an additional contents presentation section for presenting newly added content by a recognizable form based on a comparison result obtained by the list comparing section;

a contents reproduction section for reproducing the content presented by the additional contents presentation section based on a control signal indicating reproduction.

BRIEF DESCRIPTION OF THE DRAWINGS

The above and other objects, advantages and features of the invention will become more fully understood from the detailed description given below and the appended drawings, and the following descriptions pertain to the embodiment of the invention are not intended to limit the invention, and wherein.

DESCRIPTION OF THE PREFERRED EMBODIMENTS

In the following embodiments, the features and the operations of a contents reproduction system of the invention will described in detail with reference to the attached drawings.

Figure 1:
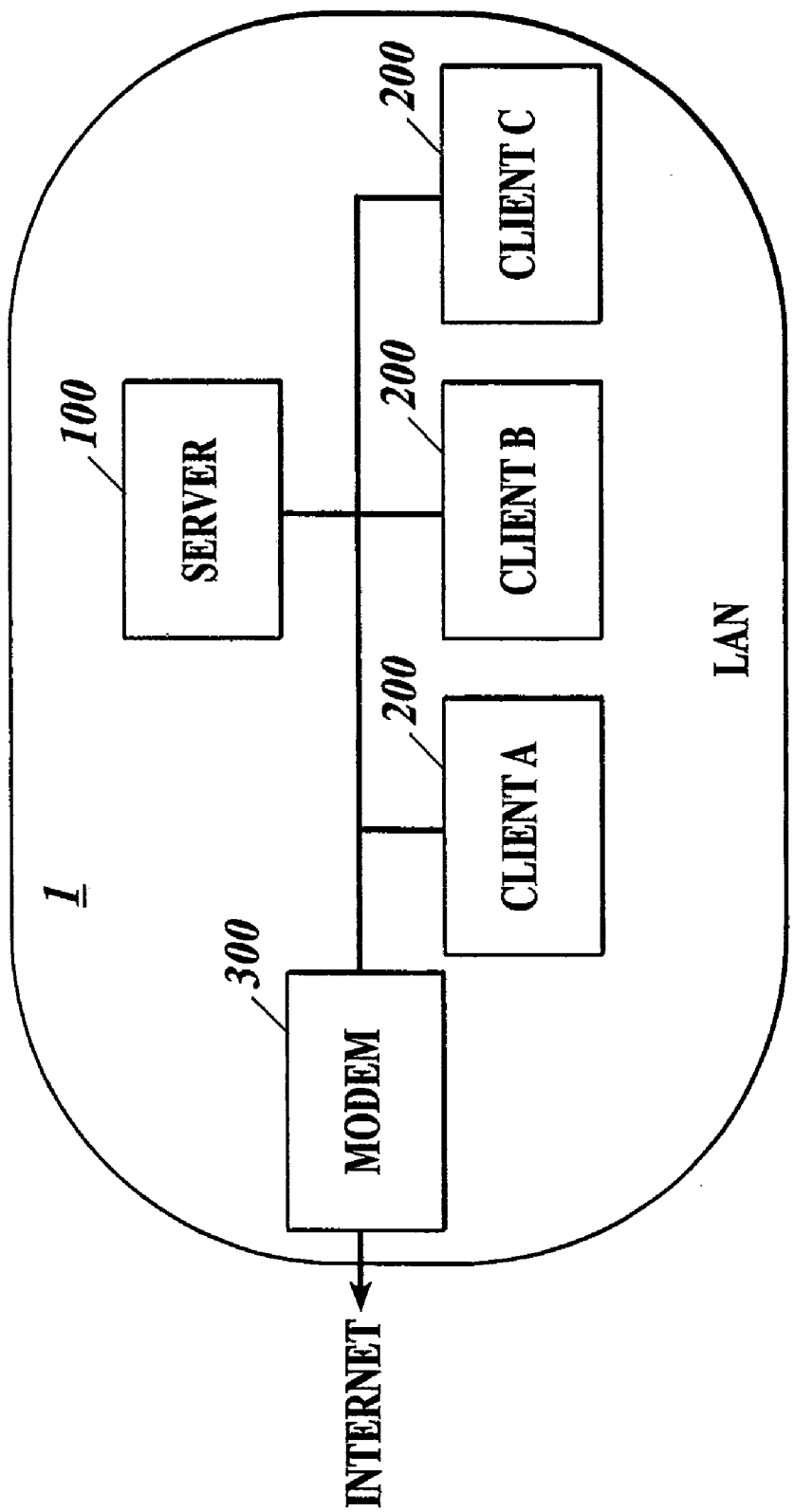
FIG. 1 is a view showing a network configuration relating to a contents reproduction system of the embodiment.

FIG. 1 is a view showing a network configuration relating to a contents reproduction system of the embodiment.

The contents reproduction system relating to this embodiment uses a network configuration called a server client system. The server client system is a network system composed of a server apparatus for storing contents obtained from external and a client apparatus by which the contents stored in the server apparatus is reproducible, which are connected communicatably.

As shown in FIG. 1, a contents reproduction system 1 is composed of a server 100 and a client 200, which are connected communicatably by LAN (wired LAN or wireless LAN). In addition, though FIG. 1 shows one server 100 and three clients 200 are connected, the number of servers and clients is not limited to this.

Also, the server 100 and the client 200 can be connected to the internet via a modem 300.

In the contents reproduction system 1 of this embodiment, a home server for obtaining contents such as video or music, and so on by downloading it from the internet or receiving television broadcasting signal is the server 100. Also, a media player for reproducing contents stored in the server 100 is client 200. In addition, for example, a personal computer, which obtains contents by ripping CD, and so on can be utilized as the server 100, and a television receiver and an audio system (stereo), the personal computer, and so on can be utilized as the client 200.

In the contents reproduction system 1, the server 100 performs release about the stored contents to the client 200. The client 200 reproduces the predetermined content from the contents released by the server 100. In this case, for example, the client 200 can display the contents released by the server 100 as a list format, and easily reproduce desired content selected from the contents list selected by a user.

Figure 2:
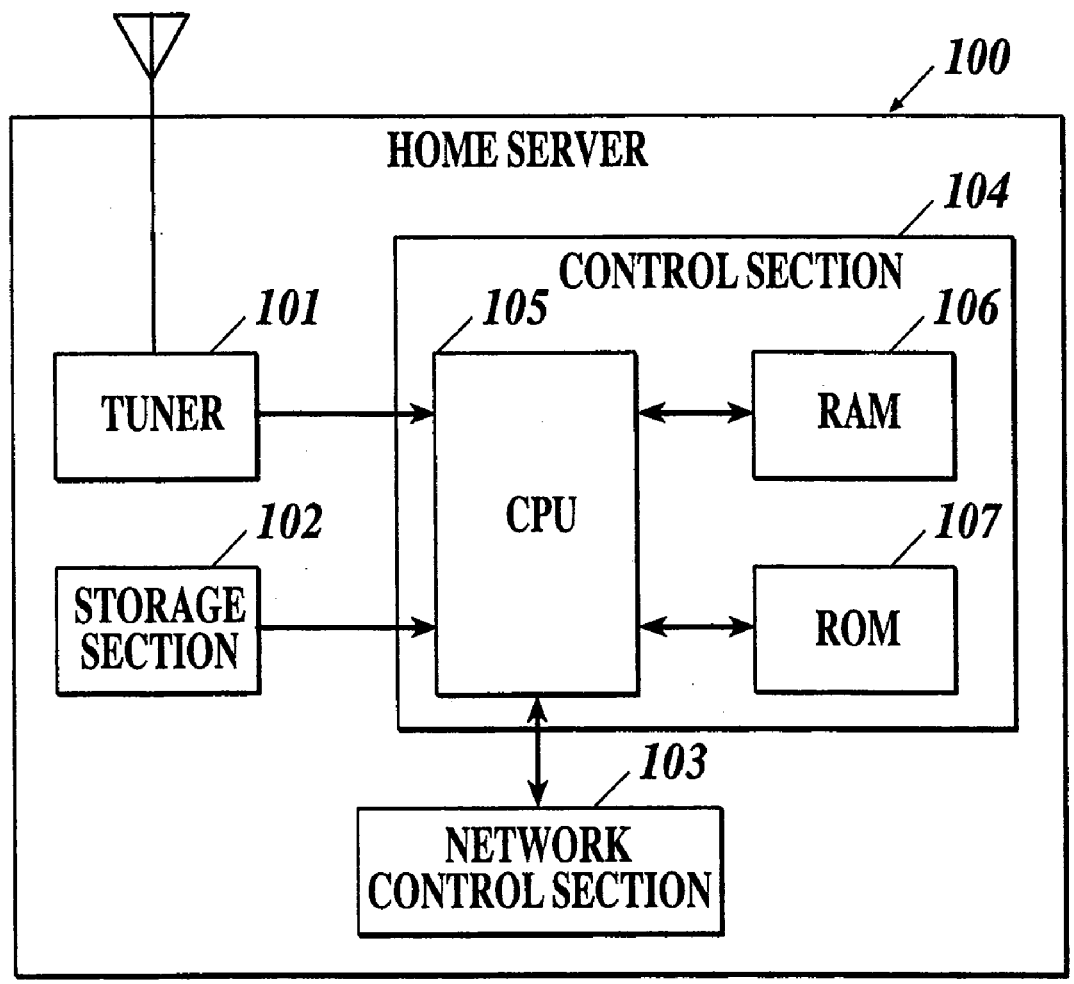
FIG. 2 is a block diagram showing an outline configuration of a home server 100 relating to the embodiment.
Figure 3A:
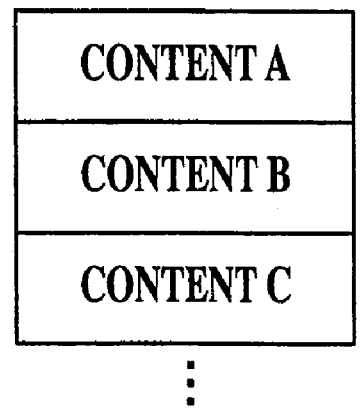
FIGS. 3A-3C are views each explaining an example of contents lists prepared and stored in the home server 100.
Figure 3B:
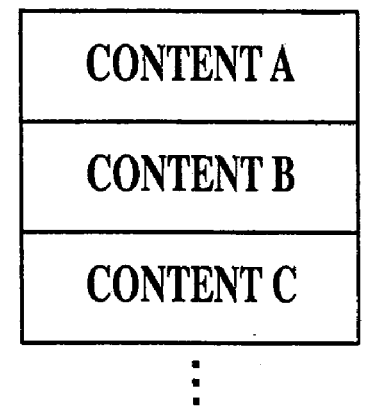
Figure 3C:
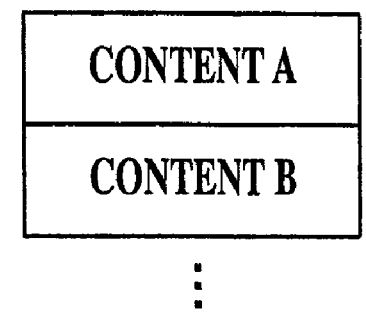

FIG. 2 is a block diagram showing an outline configuration of a home server 100 relating to the embodiment. Also, FIGS. 3A-3C are views each explaining an example of contents lists prepared and stored in the home server 100.

As shown in FIG. 2, the home server 100 relating to the embodiment is composed of a tuner 101, a storage section 102, a network connection section 103, and a control section 104.

Specifically, the tuner 101 receives television broadcasting signals present in a frequency band corresponding to a channel of a broadcasting program desired by a user from the television broadcasting signals received by a antenna for receiving the television broadcasting signals (for example, ground digital broadcasting and BS digital broadcasting, and CS digital broadcasting). Then, the predetermined signal processes (A/D conversion process, demodulation process, and so on) are performed to the television broadcasting signals, the demodulation process, and so on), and a transport stream (MPEG2-TS) is generated.

The storage section 102 is composed of a storage device such as HDD (Hard disk drive), and so on, and stores contents data (hereinafter, referred to as "contents") such as the digital video data included in TS outputted from the tuner 101 or the digital audio data, and so on. Also, The storage section 102 stores contents, and so on obtained via a network connection section 103 mentioned later.

The network connection section 103 is a LAN interface for connecting e.g. the home server 100 to the network, and performs protocol processes such as TCP/IP (Transmission Control Protocol/Internet Protocol), and so on. The network connection section 103 connects it to the internet via a modem 300, obtains contents from contents providing sites on the internet, or transmits and receives data, and so on from/to the media player 200 connected to the internet. Also, the home server 100 can transmit the contents stored in the storage section 102 via the network connection section 103.

The control section 104 is composed of e.g. a CPU (Central Processing Unit) 105, a RAM (Random Access Memory) 106, a ROM (Read Only Memory) 107, and so on, and controls each section of the home server 100.

The CPU 105 reads the processing programs, and so on stored in the ROM 107, and controls the home server 100 wholly by developing it in the RAM 106 and running it.

The RAM 106 develops the processing programs, and so on performed by the CPU 105 into program storage areas in the RAM 106, and stores input data or the process result, and so on obtained when the processing program is performed, into data storage areas.

The ROM 107 is composed of e.g. a semiconductor memory, and so on, and prestores the processing programs or data, and so on. The ROM 107 stores e.g. a contents obtaining program for obtaining contents such as video or music, and so on via the tuner 101 or the network and a list preparing program for preparing a list of contents stored in the storage section 102, and a list transmission program for transmitting the prepared contents list in response to a request from the client 200.

For example, when the CPU 105 runs the list preparing program, contents lists shown in FIGS. 3A-3C are prepared. Then, data of the prepared contents lists are stored in the ROM 107.

In this embodiment, contents lists (FIGS. 3B and 3C) are prepared in addition to the list (FIG. 3A) of all contents stored in the home server 100. When the open request of contents is received from the media player 200, the contents list is transmitted for each media player 200. That is, it is configured to limit the contents released by the home server 100 for each client 200.

Thus, the home server 100 relating to this embodiment is composed of the contents obtaining section for obtaining contents such as video or music, and so on via the tuner 101 or the network, and the contents storage section for storing the obtained contents in the storage section 102.

Also, the home server 100 relating to this embodiment is composed of the list preparing section for preparing a list of contents stored in the storage section 102 by performing the list preparing program by the CPU 105, and the list transmitting section for transmitting the prepared contents list in response to the request from the client 200.

Figure 4:
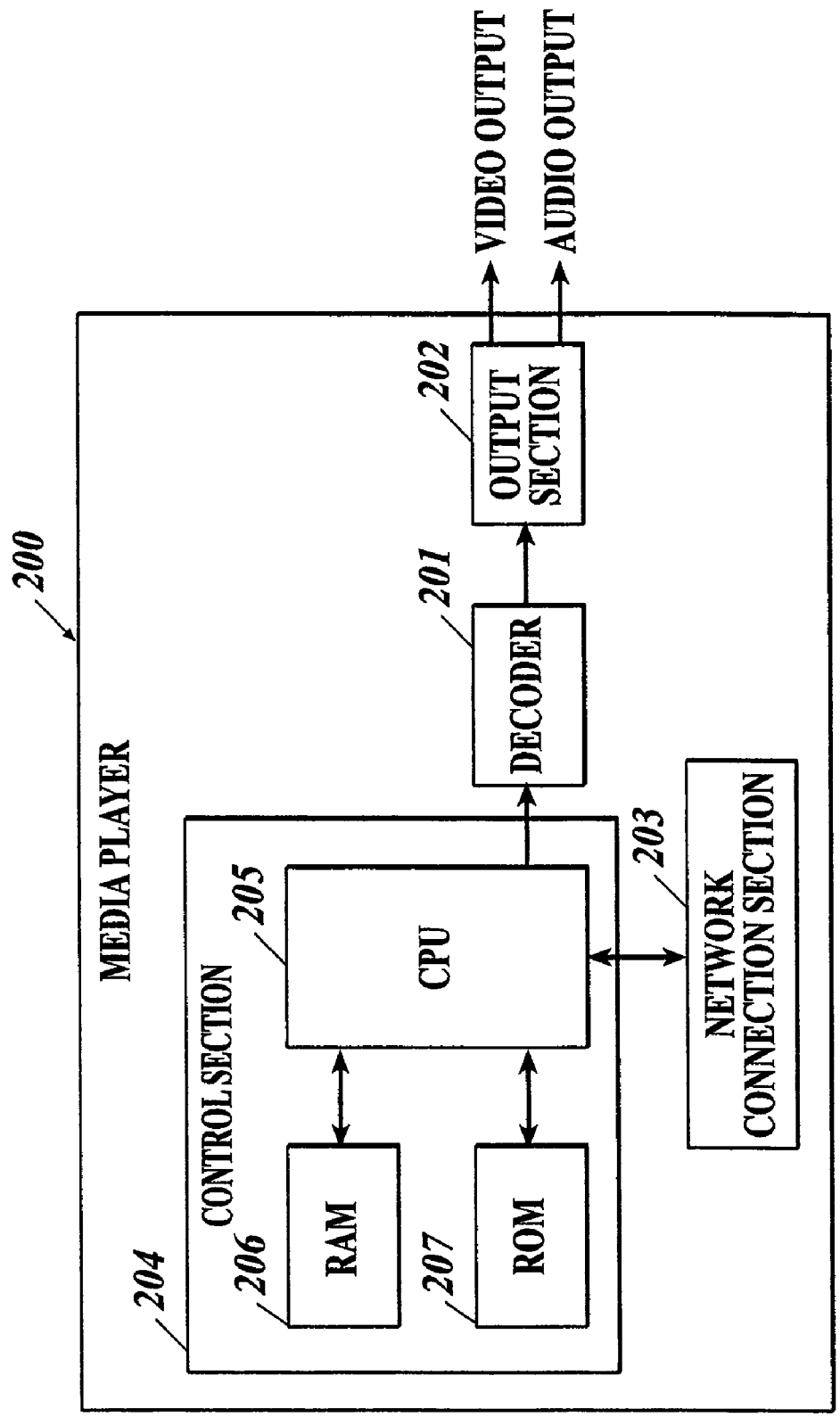
FIG. 4 is a block diagram showing an outline configuration of a media player 200 relating to the embodiment.

FIG. 4 is a block diagram showing an outline configuration of a media player 200 relating to the embodiment.

As shown in FIG. 4, the media player 200 relating to this embodiment is composed of a decoder 201, an output section 202, a network connection section 203, and a control section 204.

Specifically, the decoder 201 decodes contents (digital video data and digital audio data) obtained via the network connection section 203 mentioned later.

The output section 202 performs predetermined signal processes (D/A conversion process, and so on) to the decoded digital data, and outputs analog video or audio signals to an external equipment such as a television receiving equipment, and so on.

The network connection section 203 is a LAN interface for connecting e.g. the home server 100 to the network. The network connection section 203 performs protocol processes such as TCP/IP (Transmission Control Protocol/Internet Protocol), and so on, and transmits and receives data, and so on to/from the home server 100 connected to the network. It is possible to obtain contents or contents lists transmitted from the home server 100 via the network connection section 203.

The control section 204 is composed of e.g. a CPU (Central Processing Unit) 205, a RAM (Random Access Memory) 206, a ROM (Read Only Memory) 207, and so on, and controls each section of the media player 200.

The CPU 205 reads the processing program, and so on stored in the ROM 207, and controls the media player 200 wholly by developing it in the RAM 206 and running it.

The RAM 206 develops the processing programs, and so on performed by the CPU 205 into program storage areas in the RAM 206, and stores input data or the process result, and so on obtained when the processing program is performed, into data storage areas.

The ROM 207 is composed of e.g. a semiconductor memory, and so on, and prestores the processing programs or data, and so on. The ROM 207 stores e.g. a contents retrieval program for discriminating presence or absence of the content added to the home server 100 by comparing, in a predetermined interval, two contents lists which are obtained from the home server 100, and a contents reproduction program for reproducing the contents. Also, the ROM 207 stores the contents list obtained from the home server 100.

Thus, the media player 200 relating to this embodiment is composed of a list obtaining section for obtaining the contents lists from the home server 100 via the network connection section 203, and a list storage section for storing the contents list obtained by the list obtaining section in the ROM 207.

Figure 5:
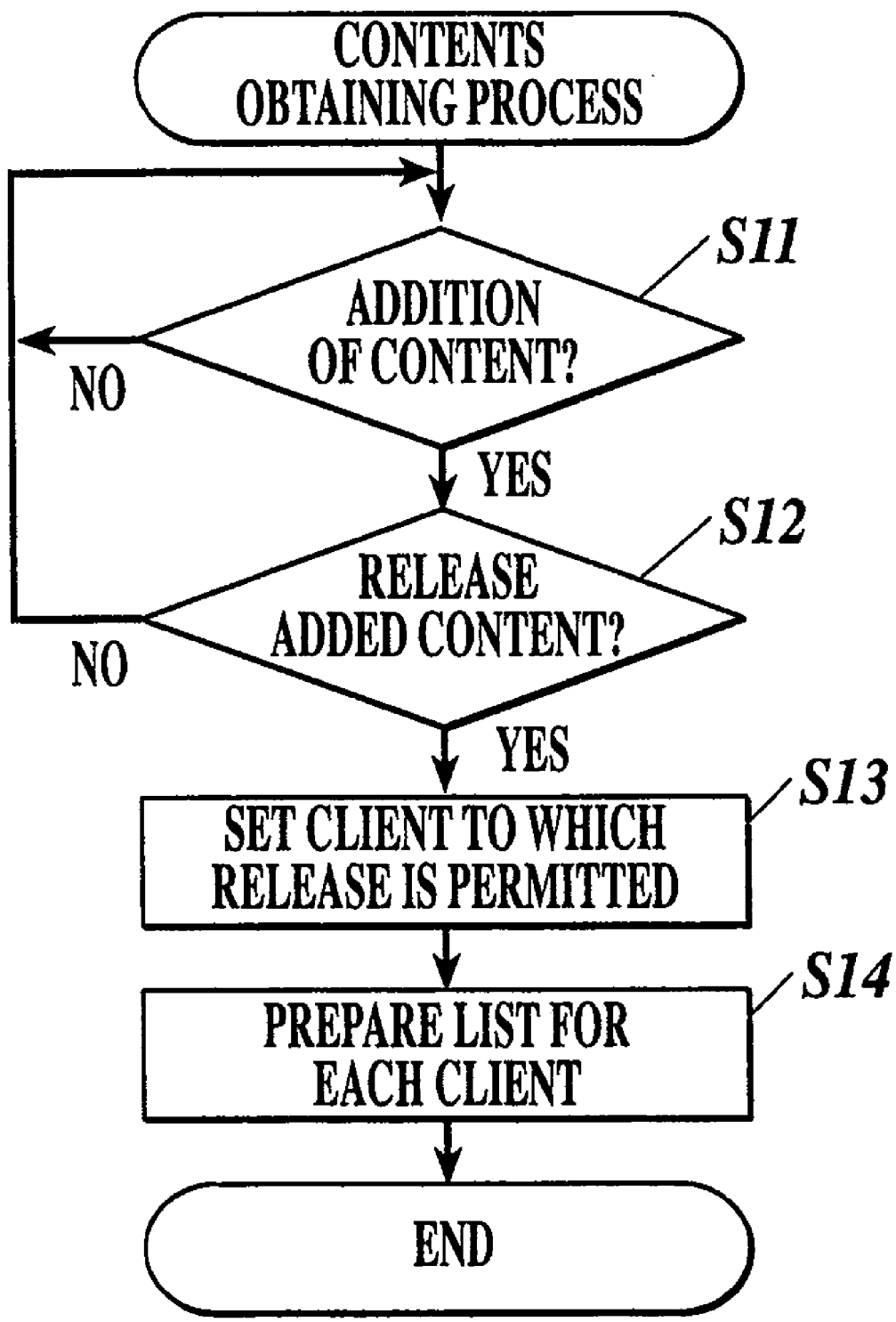
FIG. 5 is a flowchart of contents obtaining processes to be performed in the home server 100 relating to the embodiment as an example.

FIG. 5 is a flowchart of contents obtaining processes to be performed in the home server 100 relating to the embodiment as an example. This contents obtaining processes is performed by running the contents obtaining program stored in the ROM 107 by the CPU 105.

In FIG. 5, it is judged whether content is newly added or not in step S11. An operation of a user, automatic obtaining, and so on are considered as an example that content is newly added. The process of obtaining the content is performed via the tuner 101 or the network connection section 103. The obtained content is stored in the storage section 102 composed of the hard disk, and so on via the control section 104.

In step S12, whether the newly added content is released to the media player 200 side or not is confirmed. Since it is not necessary to prepare the contents list mentioned later when the content is not released to the media player 200 side, the process moves to the step S11.

In step S13, with respect to the newly added content, whether release is permitted or not is set for each media player 200 (a client release permission setting section), and setting information is generated. Specifically, this setting is performed by a user.

In step S14, a contents list is prepared for each media player 200 based on the setting information in the step S13. Specifically, the newly added content is registered into the contents list for the media player 200 permitted as to release. That is, the contents list is prepared for each media player 200, and it is possible to transmit the contents list corresponding to each media player 200.

Figure 6:
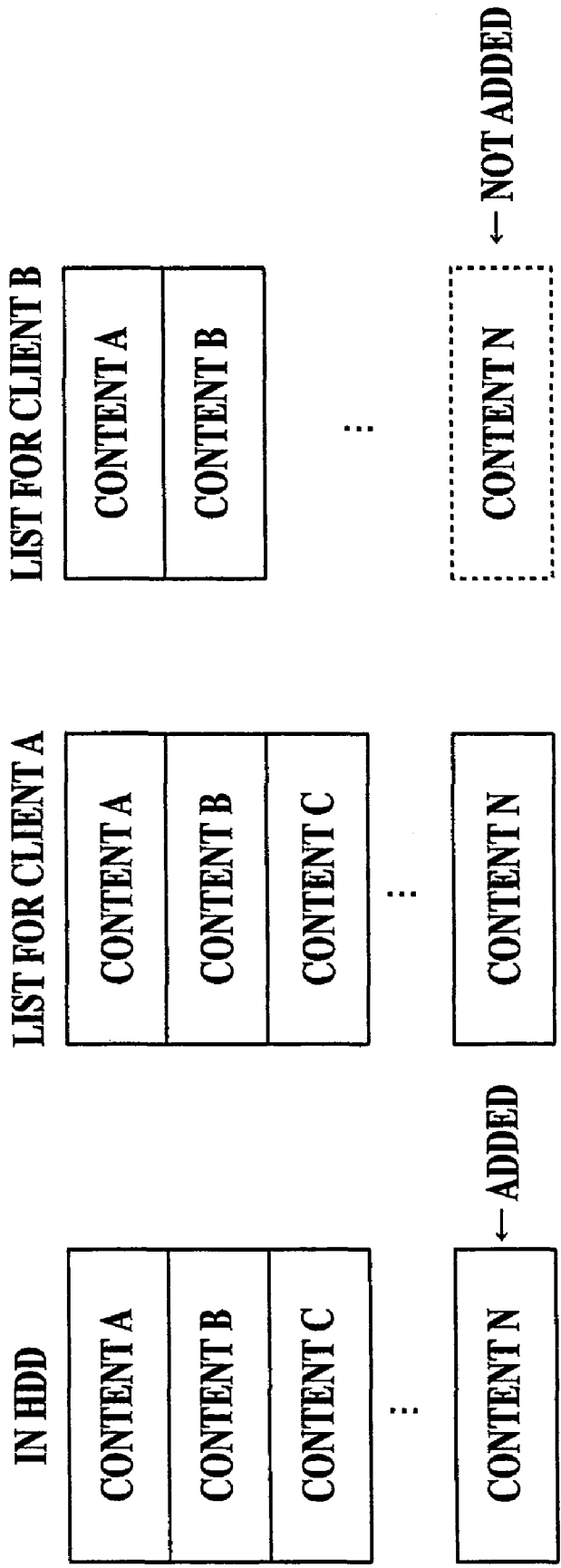
FIG. 6 is a view showing contents lists to which additional information of new content N is registered.

With respect to the above mentioned contents obtaining processes, an example in a case that the storage section 102 stores contents A, B and C (see FIGS. 3A-3C) and content N is newly added is explained concretely. FIG. 6 is a view showing contents lists to which additional information of new content N is registered.

As shown in FIGS. 3A-3C, before the content N is added, the contents lists are prepared based on information of contents A, B and C stored in the storage section 102, and contents lists for every media player 200 are stored in the ROM 107. Then, when the content N is added to the storage section 102 and release to client A is permitted, the contents lists are prepared as shown in FIG. 6.

That is, in a list of all contents stored in the storage section 102 and a contents list for client A, the content N is added. On the other hand, since release of the content N to client B is not permitted, the content N is not added to the contents list for client B (contents list is not updated).

Figure 7:
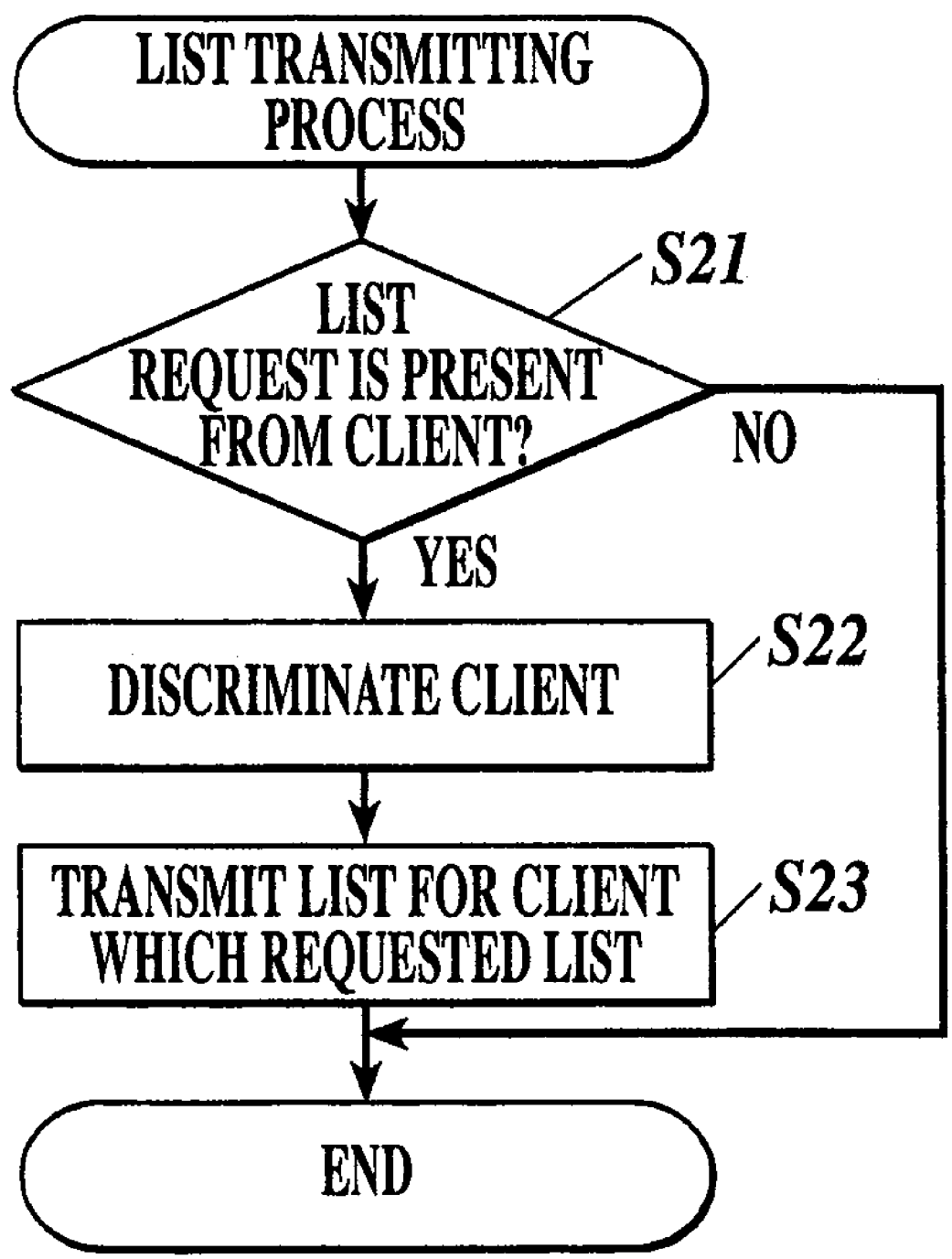
FIG. 7 is a flowchart showing list transmitting processes to be performed in the home server 100 relating to the embodiment as an example.

FIG. 7 is a flowchart showing list transmitting processes to be performed in the home server 100 relating to the embodiment as an example. This list transmitting processes are realized by running the list transmission program stored in the ROM 107 by CPU 105.

In FIG. 7, it is judged whether contents list request is received from the media player 200 or not in step S21. As a timing by which the contents list is requested, examples in a case that media player 200 is started or an operation is performed by a user (for example, depression of a request button of a remote controller), or a time preset by the media player 200 side passed, and so on are considered.

In step S22, the media player 200 which requests the contents list is discriminated (a client discrimination section). The discrimination of the media player 200 is performed based on client identification information (for example, IP address, and so on) transmitted from the media player 200.

In step S23, the contents list corresponding to the media player 200 that requested the contents list is transmitted. The contents list to be transmitted is prepared for each media player 200, and is a unique contents list for the media player 200. Since the contents list corresponding to each media player 200 is transmitted, it is possible to limit viewing and listening of the contents for each media player 200. Thus, it provides the profits to a user.

Thus, the list transmitting processes are based on a request from the media player 200. It is possible to prevent a case that the contents list is not received because the media player 200 is not active by confirming the request from the media player 200 when transmitting the contents list. Also, a user can obtain the newest contents list if necessary.

Figure 8:
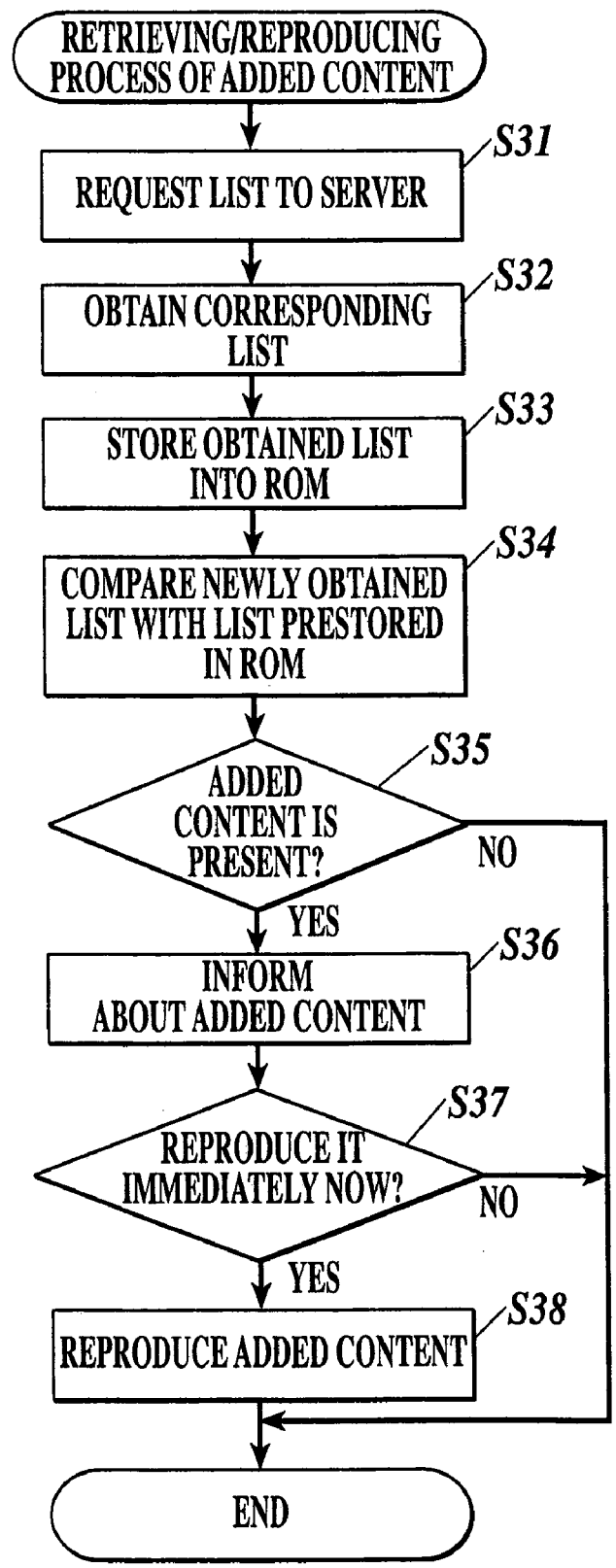
FIG. 8 is a flowchart showing retrieving/reproducing processes of additional content to be performed in the media player 200 relating to the embodiment as an example.
Figure 9:
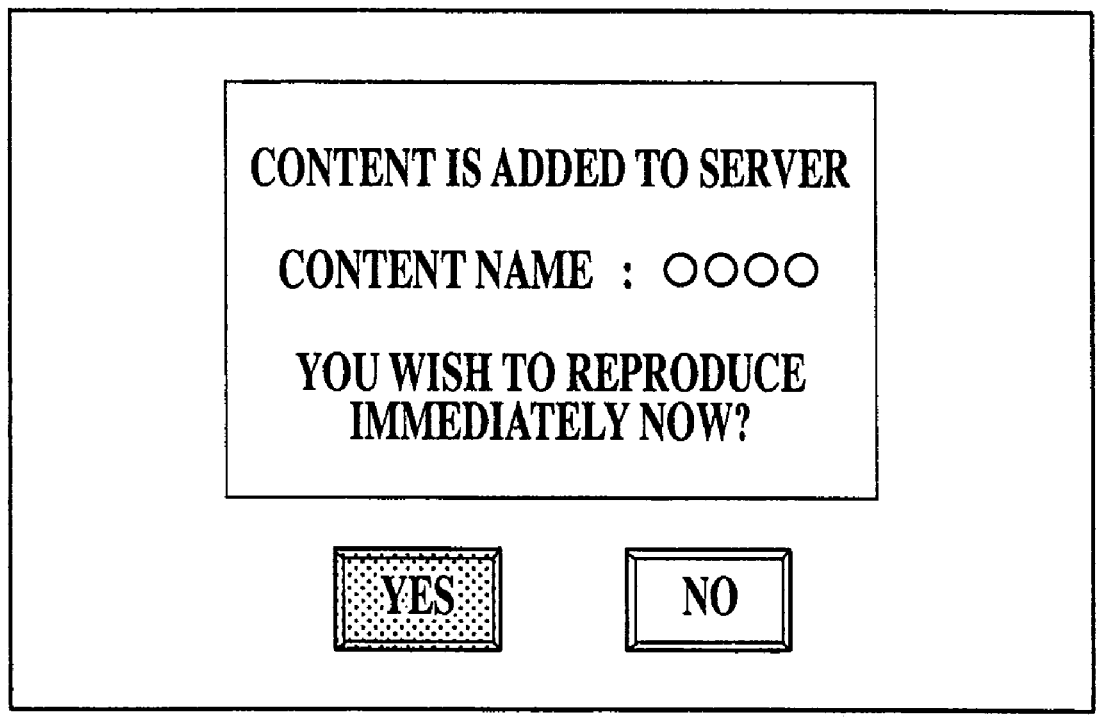
FIG. 9 is a display example of informing additional content relating to the embodiment.
Figure 10:
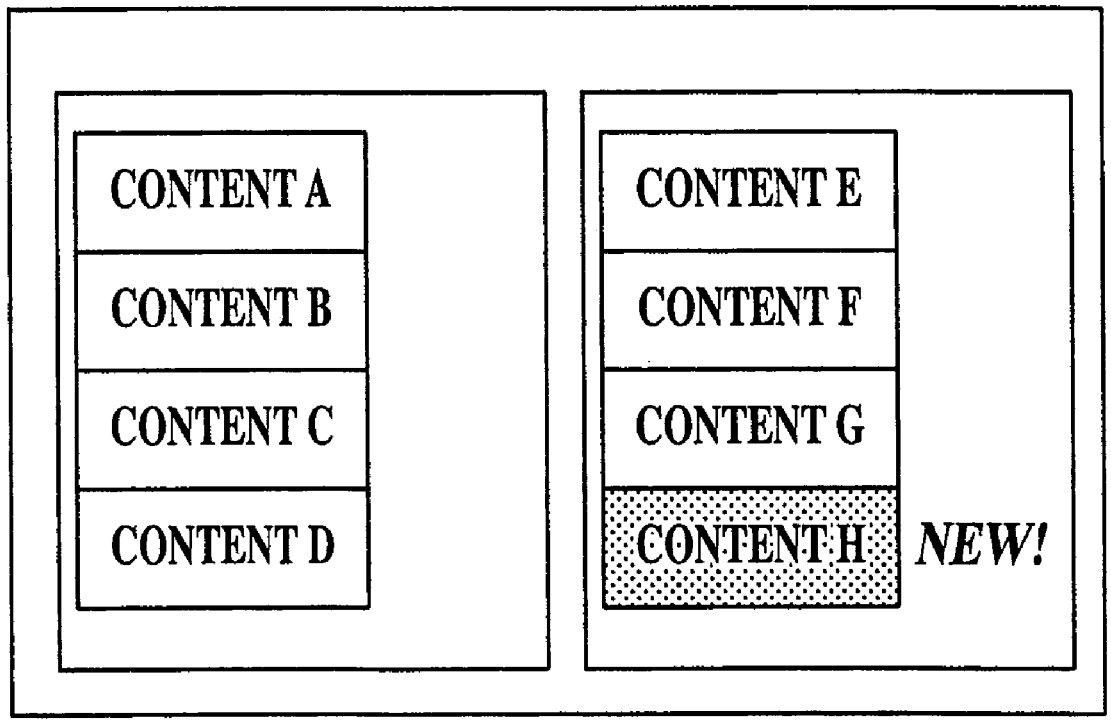
FIG. 10 is a display example of informing additional content relating to the embodiment.

FIG. 8 is a flowchart showing retrieving/reproducing processes of additional contents to be performed in the media player 200 relating to the embodiment as an example. These retrieving/reproducing processes of additional contents are realized by running a contents retrieval program, and a contents reproduction program stored in the ROM 207 by the CPU 205. Also, FIGS. 9 and 10 show display examples of notifying the additional contents relating to this embodiment.

In FIG. 8, the media player 200 requests a contents list to the home server 100 in step S31. As a timing by which the contents list is requested, examples in a case that media player 200 is started or an operation is performed by a user (for example, depression of a request button of a remote controller), or a time preset by the media player 200 side passed, and so on are considered.

In step S32, each contents list prepared for each media player 200 is obtained via the network connection section 203. In step S33, the obtained contents list is stored in the ROM 207 composed of a non-volatile memory, and so on.

In step S34, a contents list newly obtained in step S32 is compared with the contents list prestored in the ROM 207 (a list comparing section).

In step S35, it is judged whether the newly added content is present or not based on the comparison result in step S34. Since notification mentioned later is not necessary when the newly added content is not present, the process is ended.

In step S36, it is notified that content(s) is newly added (a additional contents presentation section). The notification is performed by a display monitor of an external equipment connected to an output terminal provided to the output section 202 of the media player 200.

Specifically, as shown in FIG. 9, a method of picking up only newly added content and displaying it is considered. Since the newly added content is only displayed, a user can easily know addition of the content. As a still further example, as shown in FIG. 10, it is possible to display the newly obtained contents list as a list, change color only for the added portion, or display message such as "NEW". FIG. 10 shows that the content H is the newly added content.

In step S37, it is confirmed whether the added contents is reproduced immediately or not. For example, in a case of FIG. 9, a control signal indicating reproduction of the content is transmitted to the control section 204 by selecting "YES" button. As a still further example, in a case of FIG. 10, the control signal indicating reproduction is transmitted to the control section 204 by selecting the newly added contents H. Thus, a user can select the reproduction of the newly added content by an easy operation.

In step S38, when the control section 204 receives the control signal indicating reproduction, the contents reproduction program is ran, and the newly added content is reproduced (a contents reproduction section). For example, data of the contents is requested to the home server 100. Then, the predetermined process is performed to the content data transmitted from the home server 100 in response to the request, and the processed data is outputted (streaming reproduction).

As above mentioned, though the embodiments relating to the invention is concretely explained, the invention is not limited to the embodiments, and the embodiments can be changed in the range which does not deviate from the outline of the invention.

For example, in the embodiment, though a plurality of media players 200 are connected to one home server 100, it is possible to use a plurality of home servers 100 in order to use properly for every use.

Also, in the embodiment, though the home server 100 obtains contents and provides the contents in response to a request from the media player 200, it is possible to sequentially collect contents which media player 200 obtained, by the home server 100.

Also, in the embodiment, though the media player 200 includes the output terminal for outputting analog video or audio signals to the external equipment, for example, it is possible to use a display section such as a liquid crystal panel, and so on and an audio output section such as a speaker, and so on. In such case, the display section converts digital video signals outputted from a decoder to analog video signals, and outputs video based on the analog video signal. Also, the audio output section converts digital audio signals to analog audio signals outputted from the decoder, and outputs audio based on the analog audio signal.

Also, in the embodiment, though the transmitting process of the contents list is performed based on a request from the media player 200, it is possible to transmit the contents list immediately after preparing the contents list when content is newly added. If the media player 200 is active, a user can know addition of content at the timing of adding the content by immediately transmitting the contents list. In addition, when it is not desired to prevent viewing and listening by displaying the contents list (for example, in a case of reproducing the other contents, and so on), it is possible to set the automatic transmission of the contents list in an invalid state.

As a still further example, when plural persons use one media player 200, viewing and listening of contents often should be limited for some users (for example, when you do not want to show programs for adults to child, and so on). In such case, it is useful to classify contents capable of viewing and listening by each user. It is possible to set the classification using user accounts.

Specifically, first, with respect to newly added content, whether release is permitted or not is set for each user, and setting information is generated (a user release permission setting section). Specifically, this setting is performed by a user operation, and a contents list for a user who is permitted about release is prepared based on the setting information.

Then, A user requiring the contents list is discriminated when the contents list is requested (a user discrimination section). The discriminating of the user is performed based on user identification information (for example, account information, and so on) transmitted from the media player 200 logged in by the user. Accordingly, it is possible to transmit contents list corresponding to each user.

According to a first aspect of the invention which is provided to solve the above mentioned problem, a contents reproduction system comprises:

a server apparatus for storing contents obtained from external and a client apparatus by which the contents stored in the server apparatus is reproducible, which are connected communicatably, wherein the server apparatus includes:

a contents obtaining section for obtaining content from external;

a contents storage section for storing the content obtained by the contents obtaining section;

a list preparing section for preparing a list of the contents stored in the contents storage section; and a list transmitting section for transmitting the contents list prepared by the list preparing section to the client apparatus, and the client apparatus includes:

a list obtaining section for obtaining the contents list from the server apparatus;

a list storage section for storing the contents list obtained by the list obtaining section;

a list comparing section for comparing a first contents list stored in the list storage section and a second contents list newly obtained by the list obtaining section;

an additional contents presentation section for presenting newly added content by a recognizable form based on a comparison result obtained by the list comparing section;

a contents reproduction section for reproducing the content presented by the additional contents presentation section based on a control signal indicating reproduction.

According to a second aspect of the invention, the contents reproduction system according to first aspect of the invention, the additional contents presentation section presents only the newly added content.

According to a third aspect of the invention, the contents reproduction system according to first or second aspect of the invention, the server apparatus further comprises:

a client discrimination section for discriminating the client apparatus based on a client identification information transmitted from the client apparatus; and a client release permission setting section for permitting release for each client apparatus with respect to the newly obtained content, wherein the list preparing section prepares a contents list for each client apparatus based on setting information by the client release permission setting section, and the list transmitting section transmits the contents list corresponding to each client apparatus.

According to a fourth aspect of the invention, the contents reproduction system according to first or second aspect of the invention, the server apparatus further comprising:

a user discrimination section for discriminating a user based on user identification information transmitted from the client apparatus; and a user reproduction permission setting section for permitting reproduction for each user with respect to the newly obtained content, wherein the list preparing section prepares a contents list for each user based on setting information by the user release permission setting section, and the list transmitting section transmits the contents list corresponding to each user.

According to a fifth aspect of the invention, in the contents reproduction system according to any one of first to fourth aspects of the invention, the list preparing section prepares the contents list when the contents obtaining section newly obtains content, and the list transmitting section immediately transmits the contents list prepared by the list preparing section.

According to a sixth aspect of the invention, in the contents reproduction system according to first or fifth aspect of the invention, the list transmitting section transmits the contents list prepared by the list preparing section, based on a request from the client apparatus.

According to a seventh aspect of the invention, a contents reproduction system comprises:

a server apparatus for storing contents obtained from external and a client apparatus by which the contents stored in the server apparatus is reproducible, which are to be connected communicatably, wherein the server apparatus includes:

a contents obtaining section for obtaining content from external;

a contents storage section for storing the content obtained by the contents obtaining section;

a client discrimination section for discriminating the client apparatus based on client identification information transmitted from the client apparatus; and a client release permission setting section for permitting release for each client apparatus with respect to the newly obtained content, a list preparing section for preparing a list of the contents stored in the contents storage section for each client apparatus, based on setting information by the client release permission setting section when the contents obtaining section newly obtains content; and a list transmitting section for transmitting the contents list prepared by the list preparing section to the client apparatus immediately or based on a request from the client apparatus, and the client apparatus includes:

a list obtaining section for obtaining the contents list from the server apparatus;

a list storage section for storing the contents list obtained by the list obtaining section;

a list comparing section for comparing a first contents list stored in the list storage section and a second contents list newly obtained by the list obtaining section;

an additional contents presentation section for presenting newly added content by a recognizable form based on a comparison result obtained by the list comparing section;

a contents reproduction section for reproducing the content presented by the additional contents presentation section based on a control signal indicating reproduction.

According to an eighth aspect of the invention, a client apparatus connected communicatably to a server apparatus for storing contents obtained from external, and the client apparatus by which the contents stored in the server apparatus is reproducible, the apparatus comprises:

a list obtaining section for obtaining the contents list from the server apparatus;

a list storage section for storing the contents list obtained by the list obtaining section;

a list comparing section for comparing a first contents list stored in the list storage section and a second contents list newly obtained by the list obtaining section;

an additional contents presentation section for presenting newly added content by a recognizable form based on a comparison result obtained by the list comparing section;

a contents reproduction section for reproducing the content presented by the additional contents presentation section based on a control signal indicating reproduction.

According to the invention, it is possible to easily know which content is added in a server on the network at a client side, and easily reproduce the content. That is, since the user can reproduce the content by an easy operation of selecting the presented additional content, the convenience at the time of reproducing the content is improved.

What is claimed is:

1. A contents reproduction system comprising:

a server apparatus for storing contents obtained from external and a plurality of client apparatuses by which the contents stored in the server apparatus are reproducible, wherein the server apparatus is to be connected communicably with the client apparatuses, and wherein the server apparatus includes:

a contents obtaining section for obtaining content from external;

a contents storage section for storing the content obtained by the contents obtaining section;

a client discriminating section for discriminating each client apparatus based on client identification information transmitted from the respective client apparatus;

a client release permission setting section for respectively setting whether release is permitted for each client apparatus with respect to newly obtained content:

a list preparing section for preparing a respective contents list of the contents stored in the contents storage section for each client apparatus based on setting information for the respective client apparatus from the client release permission setting section; and a list transmitting section for transmitting the respective contents list prepared by the list preparing section to the respective client apparatus, and each of the client apparatuses includes:

a list obtaining section for obtaining the respective contents list from the server apparatus;

a list storage section for storing the respective contents list obtained by the list obtaining section;

a list comparing section for comparing a first contents list stored in the list storage section and a second contents list newly obtained by the list obtaining section to judge whether newly added content is present or not;

an additional contents presentation section for presenting the newly added content by a distinguishable form based on a comparison result obtained by the list comparing section; and a contents reproduction section for reproducing the content presented by the additional contents presentation section based on a control signal indicating reproduction.

2. The contents reproduction system according to claim 1, wherein the additional contents presentation section presents only the newly added content.

3. The contents reproduction system according to claim 1, wherein the list preparing section prepares each respective contents list when the contents obtaining section newly obtains content, and the list transmitting section immediately transmits each respective contents list prepared by the list preparing section.

4. The contents reproduction system according to claim 1, wherein the list transmitting section transmits each respective contents list prepared by the list preparing section, based on a request from the respective client apparatus.

5. A contents reproduction system comprising:

a server apparatus for storing contents obtained from external and a client apparatus by which the contents stored in the server apparatus are reproducible, which are to be connected communicably, wherein the server apparatus includes:

a contents obtaining section for obtaining content from external;

a contents storage section for storing the content obtained by the contents obtaining section;

a user discrimination section for discriminating each of a plurality of users based on user identification information transmitted from the client apparatus;

a user reproduction permission setting section for respectively setting whether reproduction is permitted for each user with respect to the newly obtained contents, a list preparing section for preparing respective contents list of the contents stored in the contents storage section for each user based on setting information for the respective user from the user release permission setting section, and a list transmitting section for transmitting each respective contents list prepared by the list preparing section to the client apparatus, and the client apparatus includes:

a list obtaining section for obtaining each respective contents list from the server apparatus;

a list storage section for storing each respective contents list obtained by the list obtaining section;

a list comparing section for comparing a first contents list stored in the list storage section and a second contents list newly obtained by the list obtaining section to judge whether newly added content is present or not;

an additional contents presentation section for presenting the newly added content by a distinguishable form based on a comparison result obtained by the list comparing section; and a contents reproduction section for reproducing the content presented by the additional contents presentation section based on a control signal indicating reproduction.

6. A contents reproduction system comprising:

a server apparatus for storing contents obtained from external and a plurality of client apparatuses by which the contents stored in the server apparatus are reproducible, wherein the server apparatus is to be connected communicably with the client apparatuses, and wherein the server apparatus includes:

a contents obtaining section for obtaining content from external;

a contents storage section for storing the content obtained by the contents obtaining section;

a client discrimination section for discriminating each client apparatus based on client identification information transmitted from the respective client apparatus;

a client release permission setting section for respectively setting whether release is permitted for each client apparatus with respect to the newly obtained content, a list preparing section for preparing a respective contents list of the contents stored in the contents storage section for each client apparatus based on setting information for the respective client apparatus from the client release permission setting section when the contents obtaining section newly obtains content; and a list transmitting section for transmitting the respective contents list prepared by the list preparing section to the respective client apparatus immediately or based on a request from the respective client apparatus, and the client apparatus includes:

a list obtaining section for obtaining the respective contents list from the server apparatus;

a list storage section for storing the respective contents list obtained by the list obtaining section;

a list comparing section for comparing a first contents list stored in the list storage section and a second contents list newly obtained by the list obtaining section to judge whether the newly added content is present or not;

an additional contents presentation section for presenting the newly added content by a distinguishable form based on a comparison result obtained by the list comparing section; and a contents reproduction section for reproducing the content presented by the additional contents presentation section based on a control signal indicating reproduction.

7. A client apparatus connected communicably to a server apparatus for storing contents obtained from external, wherein the contents stored in the server apparatus are reproducible, and wherein the server apparatus includes:

a contents obtaining section for obtaining content from external;

a contents storage section for storing the content obtained by the contents obtaining section;

a client discriminating section for discriminating each of a plurality of client apparatus based on client identification information transmitted from the respective client apparatus;

a client release permission setting section for respectively setting whether release is permitted for each client apparatus with respect to newly obtained content:

a list preparing section for preparing a respective contents list of the contents stored in the contents storage section for each client apparatus based on setting information for the respective client apparatus from the client release permission setting section; and a list transmitting section for transmitting the respective contents list prepared by the list preparing section to the respective client apparatus, the client apparatus comprising:

a list obtaining section for obtaining the respective contents list from the server apparatus;

a list storage section for storing the respective contents list obtained by the list obtaining section;

a list comparing section for comparing a first contents list stored in the list storage section and a second contents list newly obtained by the list obtaining section to judge whether newly added content is present or not;

an additional contents presentation section for presenting the newly added content by a distinguishable form based on a comparison result obtained by the list comparing section; and a contents reproduction section for reproducing the content presented by the additional contents presentation section based on a control signal indicating reproduction.

* * * * *